Nov. 15, 1960     W. I. THELEN     2,960,299
ENGINE MOUNTING STRUCTURE
Original Filed Oct. 20, 1954     2 Sheets-Sheet 1
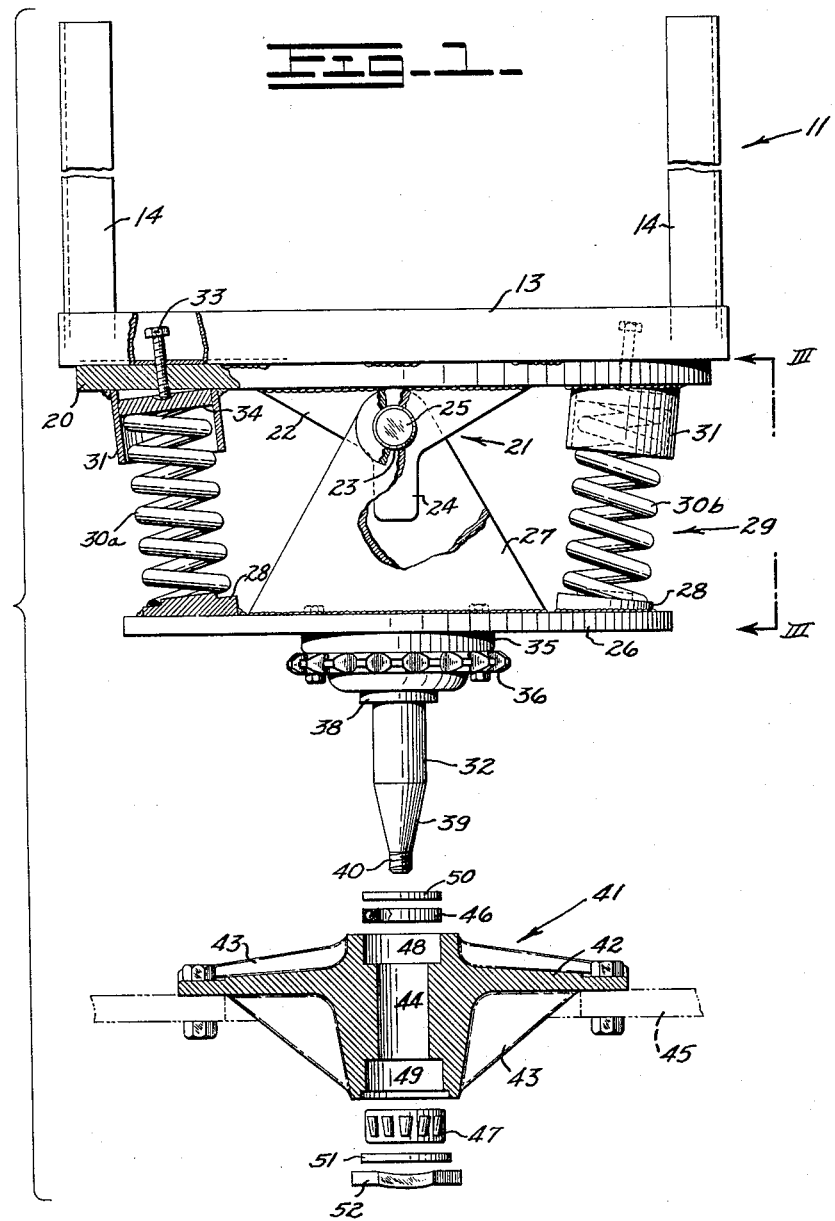
INVENTOR
WILBUR I. THELEN
BY
Laurence VanderKelen & Miller
ATTORNEYS Nov. 15, 1960 — W. I. THELEN — 2,960,299
ENGINE MOUNTING STRUCTURE
Original Filed Oct. 20, 1954 — 2 Sheets-Sheet 2
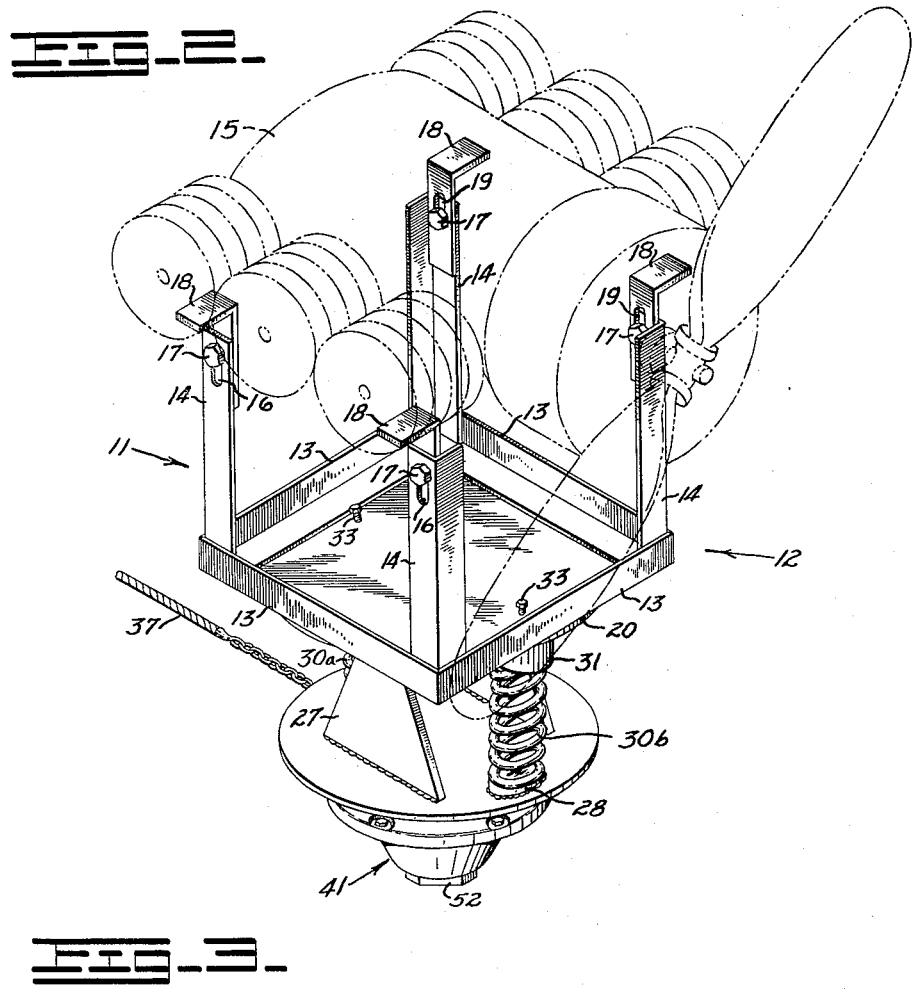
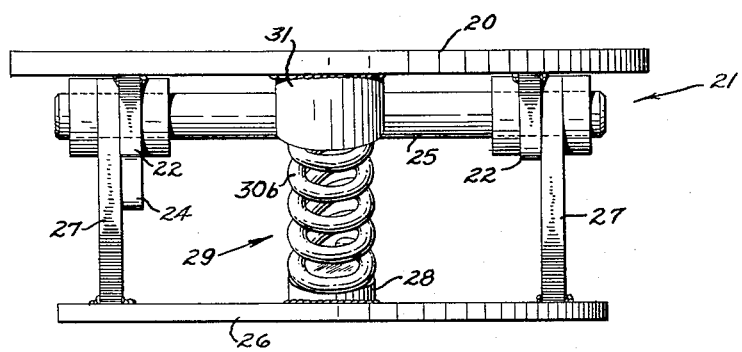
INVENTOR
WILBUR I. THELEN
BY
Laurence Vanderkelen & Miller
ATTORNEYS

United States Patent Office 2,960,299
Patented Nov. 15, 1960

2,960,299

ENGINE MOUNTING STRUCTURE

Wilbur I. Thelen, Traverse City, Mich., assignor to Arthur Thelen, Fowler, Mich.

Continuation of application Ser. No. 463,563, Oct. 20, 1954. This application Oct. 9, 1959, Ser. No. 845,573

4 Claims. (Cl. 248—8)

The present invention relates to a motor mounting device for aircraft type engines and more particularly to a mounting device which permits controlled resiliency or tilting of the motor along the line of thrust in a vertical plane while permitting positive rotation of the engine about the axis of the mount. The present invention is also directed to providing simple and secure means for permitting the rotation of such aircraft-type motors on the axis of the mount to permit directional control over water, land, ice, and snow in crafts designed to use air propulsion obtained by aircraft style engines or motors. The present invention is also directed to a structure making possible rapid and effective acceleration of the crafts indicated.

While some makeshift means for rotational mounting of aircraft engines about the axis of a mount are known, it is not believed that any of the presently-known structures have included resiliency in the stabilization of the craft to which it is to be attached, and none have integrated the turning means with the mounting structure so far as the inventor is aware.

Accordingly it is among the objects of the present invention to provide a motor mounting structure which may be attached to the deck of air propelled land, sea, ice, or snow craft by simple and secure attachment means and which may be easily rotated for directional control of the craft.

It is a further object to teach a structure wherein resiliency is provided along the vertical plane through the line of thrust.

Another object is to provide a mounting structure which acts as a stabilizing member for the crafts indicated.

It is a further object to teach adjustable resiliency in a mounting for aircraft-type engines which includes axial rotation of the entire mounting.

A further object is to teach a motor mounting cage adjustable to substantially any type of aircraft-style engine.

Other objects of the present invention including economy and standardization of mounting for any style of motor used will become increasingly apparent to those skilled in the art as the description proceeds.

In the drawings:

Figure 1 is a side elevation exploded view of the motor mount illustrating the assembly thereof.

Figure 2 is a perspective view of the mounting structure illustrating the device in its operative setting and indicating the adjustment feature of the motor cage.

Figure 3 is a front elevation of the resilient linkage between cage and lower base members.

General description

In general, the present structure consists of a motor mounting cage wherein vertically adjustable and lockable leg members extend in unlimited vertical combinations to accommodate a wide variety of aircraft-type engines. The term "aircraft-type" engines is herein used to connote motors of the well-known radial and in line styles, but is more inclusively intended to encompass any motor or engine driving a propeller or any motor of the so-called "jet" variety. The cage is provided with bearing support extensions at the bottom, generally spaced apart from the shaft or engine axis.

A spindled base member is provided having upstanding brackets pivotally matching the downwardly extending bearing support extensions of the cage. A pivot is thus established by the pivotal linking of cage and spindled base member through the brackets and extensions. Without more the engine axis could be freely tilted on this pivot, limited only by ultimate interference as the cage engaged the spindled base member. Fore and aft resilient members are provided, therefore, which are adjustable tensionally and compressionally to bias the cage bottom and spindled base in parallel relationship. These resilient members lie on the plane coincident with the axis of the aircraft engine and the axis of the motor mount structure as established by the spindle. The resilient means employed in models presently in use are in fact springs, although pneumatic, hydraulic, and other resilient means have been explored and are intended to be included within the scope of the invention.

A socket is provided which is flanged and reinforced for deck mounting. An aperture is provided through the socket for the accommodation of the spindle. Suitable bearing is provided in the socket to transmit radial and thrust loading to the socket flanges and ultimately to the deck.

A sprocket is rigidly attached to the spindle member to facilitate rotation of the spindle in the socket and provides positive turning means when a link chain, for example, is employed for remote positive rotational control.

A mounting structure is thus provided which permits tilting of the aircraft engine on its axis against adjustable compression and tension. At one and the same time the entire engine may be rotated about the axis of the motor mount. The operational importance of the deck mounting and tilting features will be discussed at length as the description proceeds, while the directional control features incident to the rotation of the mount about its axis will be apparent from the drawing.

Specific description

Referring more particularly to the drawings, in Figures 1 and 2, the motor cage 11 is composed of a frame 12 built up from structural angles 13 to form a substantially rectilinear open box. Upstanding legs 14 are provided which extend upwardly supported by the corners of the frame 12 as shown best in Figure 1. The legs 14 are also structural angles and are selected in accord with the strength characteristics desired in the cage 11 to support any given motor 15 (shown in phantom line). In some very heavy installations diagonal bracing members may be employed between the legs 14. No illustration is made of this modification which is believed to relate only to obvious strengthening of the cage 11. The legs 14 are provided with slots 16 permitting vertical adjustment as by bolts 17 of engine mounting pads 18. The pads 18 are illustrated as members being generally L-shaped in construction although suitably sized angle members slotted as at 19 to mate with the corresponding leg slots 16 have been satisfactorily employed. The pads 18 provide means for securing the motor to the cage 11 as by bolting or welding and, as is well known in the art, vibrational damping auxiliary pads may be employed where the motor 15 is connected to the pads 18. Welded construction is preferred for assembling the cage 11. The cage 11 is secured at the bottom of the frame 12 to a disc-like upper base member 20. Thus, the upper base member 20 forms a closure for the bottom of the cage 11 suitable for the mounting of motor accessories where desired (for example, battery, starter motor, fuel tanks, et cetera).

On the underside of the upper base member 20 a pivot 21 is provided by the downward extension of arms 22 in spaced parallel relationship as best shown in Figure 3. The arms 22 are provided with shaft receiving apertures 23, the said apertures 23 being in axial alignment with each other. Stop members 24 are provided as shown which are capable of being employed to prevent excessive pivot action when desired. The stop members 24 are extensions of the arms 22. The arms 22 are integrally attached to the upper base member 20 as by welding. As best illustrated in Figures 2 and 3, the arms 22 parallel the axis of the motor 15. The pivot 21 thus established a means for rocking or tilting the motor 15. The shaft 25, as will be more fully appreciated as the description proceeds, provides the tilting axis at right angles to the mount axis.

A lower base member 26, also generally a disc-like plate, is provided with parallel spaced upright brackets 27. These brackets 27 correspond matingly with the arms 22 and form a pivotal connection on shaft 25 as shown in Figure 1. Stanchions 28 are provided on the upper face of the lower base member 26 located diametrically fore and aft between the brackets 27. The stanchions 28 provide retaining means for resilient members at 29. In the illustration the springs 30 are shown as a specific embodiment of resilient means and may be either tensional or compressional, or combinations of both. Hydraulic and pneumatic resilient members, well known in the art, are intended to be included in the description. Cylindrical spring retainers 31 are attached to the lower face of the upper base plate 20 and are directed in such a manner so that when the springs 30a and 30b are inserted therein, the axes of springs 30a and 30b, retainers 31, and stanchions 28 are coincident when the upper base 20 is parallel planally with the lower base 26. The axes of the resilient means 29 are canted in a converging direction as best illustrated in Figure 1 toward the axis of the motor mount as established by the spindle 32.

Adjustment means, specifically illustrated in Figure 1 as a bolt 33 and presser disc 34 are provided in the cylindrical spring retainers 31 for varying the compression and tension characteristics in the resilient means 29. The adjusting bolts 33 are in threaded engagement with the upper base member 20 and extend upwardly within the frame 12. The spindle 32 is bolted or otherwise affixed to the lower face of the lower base member 26.

The spindle 32 is provided with a shouldered flange 35 which is secured to the lower base member 26. The shouldered flange 35 also permits the attachment of the sprocket 36. The sprocket 36 may be attached to the shoudered flange 35 by bolting or other convenient means such as welding or keying. A forging exemplifies one form in which the sprocket 36 is integral with the spindle 32. The sprocket 36 will thus accommodate a link chain 37 (see Figure 2) for positive turning of the upper and lower base members 20 and 26 and coincidentally the cage 11 and attached motor 15. The cage 11 linked to the spindled lower base member 26 at the pivot 21 turns about the axis of the mount as the spindle 32 is rotated. The spindle 32 is also provided with thrust shoulder 38 and a tapered shank 39. The lower terminal end of the spindle 32 is threaded at 40.

A socket 41, provided with a flange 42 and ribbed reinforcements 43 and having a spindle accommodating aperture 44 axially therethrough for the rotatable insertion of the spindle 32, is arranged for deck mounting as shown in Figure 1. The deck 45 (shown in phantom line) is bolted or otherwise securely attached to the socket 41 through the flange 42. The socket 41 and associated spindle 32 thus provides a turntable permitting axial rotation of the motor mount. The rotation of the motor mount is substantially frictionless by reason of the upper anti-friction bearing 46 and the lower tapered roller anti-friction bearing 47 insertable in the corresponding bearing housings 48 and 49 respectively provided in the socket 41. Upper and lower grease seals 50 and 51 complete the bearing assembly and draw nut 52 threadably and lockably engages the threaded portion 40 of the spindle 32 for retaining securely the motor mount against vertical movement.

*Operation*

In operation a substantially frictionless positive turning is accomplished by reason of the bearing details indicated and the thrust bearing 46 and tapered radial and thrust roller bearing 47 permit secure and tight adjustment while transmitting the radial and thrust loads applied by the motor 15 from the mounting structure to the deck 45. The sprocket 36 with associated chain drive 37 assures simple positive and remote control of the rotation of the mount so as to directionally control air propelled land, sea, ice, and snow craft.

Within the adjustment possible in any given installation the shock absorption characteristics of the resilient linkage 29 permit the motor axis to tilt in response to shock loading of the engine 15. This is desirable within controlled limits since it vertically adjusts the normally horizontal line of thrust in air propelling motors to suit the characteristics desired in any given craft. For example, in water craft it is desirable for early maximum speed to raise the bow of the craft as soon as possible to minimize the friction along the hull. The presently described motor mount accomplishes this by making the line of thrust adjust itself to the desired initial conditions in response to the acceleration given the motor 15. On sudden acceleration, the motor 15 is tilted upward against the resilient bias 29 described, and if the motor 15 is mounted at the rear of the craft, the forward resilient member 30a is depressed thus tending to raise the bow of the craft while tending to lower the stern. In a hydroplane-type structure, the vessel is almost immediately on the step and planing. If this mount is utilized forwardly on a vessel with a puller-type propellor, for example, the line of thrust is equally beneficial since the engine axis is similarly tilted beneficially so as to elevate the bow portion of the craft and depress the stern.

By reason of the resilient bias 29 incorporated in the structure the condition suggested is only characteristic of sudden acceleration. As the craft approaches a stabilized speed the bias tends to normalize the thrust in a generally horizontal line.

In heavy or choppy water the wave resistance frictionally contacting the hull of a typical craft also causes a resilient shift of thrust line tending to raise the bow of the craft and minimize wave shock. This results in increased stability both in straight line travel and in turning.

Adjustments to individual motors can be easily accomplished by varying the length of legs 14 and the size of mounting pads 18. Tensional and compressional adjustments are easily made in the resilient linkage by the use of the adjusting bolts 33. By reason of simplicity of the structure resilient members 30a and 30b of varying strength may be easily substituted as horse power is increased or decreased.

The structure described admits of simple adaptation to deck mounting on various conventional and non-conventional craft. In operation the structure has been substantially trouble-free and where disassembly is desired it is accomplished with no difficulty. In operation with land, sea, ice, and snow crafts, unusual craft stability is observed along with directional control at extremely high speeds. The stability is attributable in considerable measure to the mount described.

Having thus described my invention, it will be understood that modifications falling within the scope of my

I claim:

1. An engine mounting structure for selectively tilting the thrust axis of a motor in accord with acceleration or deceleration of the motor while providing for rotation of said motor about a vertical axis, the combination including: a flanged deck mounting socket; a plurality of anti-friction bearings housed in said socket; a spindle through said socket and journalled by said bearings thereby providing a vertical axis; a turning sprocket on said spindle; a disc-like spindle plate secured to said spindle adjacent said sprocket and extending radially and transversely from said spindle; a base plate in spaced apart relationship from said spindle plate; a pivot shaft securing said base plate and said spindle plate in pivotal relation, said pivot shaft axis passing through the extension of the axis of said spindle at right angles thereto; a pair of resilient bias members acting between said base plate and said spindle plate for resiliently biasing said base plate in a parallel spaced relationship with said spindle plate, one resilient bias member on one side of said shaft and the other member symmetrically located on the other side of said shaft; and means for fixedly securing a motor to said base plate in a position such that the thrust axis of said motor is transverse of the extended vertical axis of said spindle and transverse to the horizontal axis of said shaft.

2. In the structure as set forth in claim 1 and including: adjustment means bearing on said resilient bias members for selectively altering the strength of the said resilient bias members in their force against said base plate and said spindle plate.

3. In the structure as set forth in claim 2 wherein the said resilient bias members comprise compression springs.

4. An engine mounting device for air thrust engines permitting controlled rotation of such engine about a horizontal axis in accord with acceleration or deceleration of such engine, the combination comprising a flanged deck mounting socket having an axial opening therethrough; anti-friction bearing elements coaxially housed in said socket for transmitting radial and axial thrust loads; a spindle through the opening in said housing and journalled in said anti-friction bearing elements; a turning sprocket secured around said spindle and coaxial therewith; a draw nut threadably engageable with said spindle securing said spindle against axial displacement; a disc-like spindle plate secured at the center thereof to said spindle and being transverse thereto; a pair of parallel spaced apart supports on said plate and providing journal means therethrough; a base plate; a pair of depending mounting lugs extending from said base plate, each mounting lug having a journal opening therethrough in axial register with the journal means provided in said supports; a pivot shaft axially through said journal means of said supports and said lugs providing a tilting axis for said base plate in relationship to said spindle; a pair of resilient bias members on either side of said pivot shaft and substantially between said supports and bearing against said plate on one side and said spindle plate on the other side; and motor securing means fixed to said base plate for securing a motor thereto having a thrust axis transverse to said pivot shaft and to said spindle axis.

References Cited in the file of this patent
UNITED STATES PATENTS

| | | |
|---|---|---|
| 1,187,309 | Grove | June 13, 1916 |
| 1,564,692 | Largillier | Dec. 8, 1925 |
| 2,123,226 | Benedek | July 12, 1938 |